United States Patent
Song

(10) Patent No.: US 6,700,574 B1
(45) Date of Patent: Mar. 2, 2004

(54) SPATIAL DATA OBJECT INDEXING ENGINE

(75) Inventor: Yiping Song, Cedar Rapids, IA (US)

(73) Assignee: Siemens Transportation Systems, Inc., Sacramento, CA (US)

( * ) Notice: Subject to any disclaimer, the term of this patent is extended or adjusted under 35 U.S.C. 154(b) by 0 days.

(21) Appl. No.: 09/430,447

(22) Filed: Oct. 29, 1999

(51) Int. Cl.[7] ................................................ G06T 9/00
(52) U.S. Cl. ......................................................... 345/423
(58) Field of Search ................................. 345/418, 419, 345/420, 421, 423; 707/5, 6, 3, 2, 100; 706/20; 378/901

(56) References Cited

U.S. PATENT DOCUMENTS

| | | | |
|---|---|---|---|
| 5,781,906 A | | 7/1998 | Aggarwal et al. |
| 5,953,722 A | * | 9/1999 | Lampert et al. ............. 701/200 |
| 6,081,803 A | * | 6/2000 | Ashby et al. ................ 340/990 |

FOREIGN PATENT DOCUMENTS

| | | |
|---|---|---|
| EP | 0838663 | 4/1998 |
| EP | 0280795 | 9/1998 |

OTHER PUBLICATIONS

Foley (Computer Graphics: Principles and Practice Second Edition in C: section 12.6.3: Octrees—p. 552).*

International Search Report, dated Mar. 10, 2003.

* cited by examiner

*Primary Examiner*—Almis R. Jankus

(57) ABSTRACT

A method of indexing spatial object data comprises dividing space that contains objects based on the clustering of the objects within the space. A computer readable medium contains computer executable instructions. The instructions cause the computer to divide a space containing spatial objects based on clustering of the objects within the space. A method of searching spatial object data includes utilizing spatial object data that has been gridded based upon clustering of the spatial objects. The grids are then recursively checked to see if they cover a range of interest. If the grids overlap the range of interest objects within the grids are checked to see if they satisfy a search criterion.

26 Claims, 3 Drawing Sheets

SPATIAL DATA OBJECT INDEXING ENGINE

BACKGROUND OF THE INVENTION

1. Field of the Invention

The present invention relates to data indexing and retrieval. More specifically, the present invention relates to a method of indexing spatial object data and a method of searching the indexed data.

2. Problems in the Art

A map is composed of a large volume of geographical features, such as roads, rivers, parks, geo-political regions, etc. A vector map is a digitized form of a descriptive map where all geographical features are digitized and stored in some digitally retrievable media. A vector map or database containing digitized map data can be purchased from Navigation Technologies Corp. in Rosemont, Ill. or Etak, Inc. in Menlo Park, Calif. A digitized feature may be recorded with its spatial information in coordinates (longitude and latitude) in addition to its other non-spatial attributes, e.g., the feature's name. The digitization of a map creates a large quantity of data. Therefore, to search through all this data requires a substantial amount of CPU power and processing time. To search through this spatial object data more efficiently, it would be desirable to index the data to allow for a search through the index.

Spatial object data is not only capable of characterizing two-dimensional space, such as in vector maps, or three dimensional space, such as in planetary or galactic maps, but also may characterize other multi-dimensional space, comprising four or more dimensions. A defined space is a space, of desired dimensions, bounded as indicated by the search to be performed or the data to be stored or indexed.

There are two common methods for indexing spatial object data. The first method of indexing data is by storing it in an indexed array (or list). A search through an indexed array to find a desired object requires all of the objects within the array to be searched, requiring a large amount of CPU time.

The second method commonly used to index spatial object data is to impose a grid system upon the space that contains spatial objects, wherein all grids are of the same size. In this gridding method, it is difficult to determine the proper grid size. If the grids are too large, they will encompass many objects, not saving much search time over the indexed array method. If the grids are too small, then more computer memory will be needed to support the grid structure and there will be more spatial objects that cross boundaries. The prior art gridding method does not give any consideration to the variation in object density within the space of interest. For example, a prior art grid cell that covered a rural area may contain many fewer objects than the same grid cell that encompasses an urban area. There is a need in the art for a method of indexing data which allows the indexed data to be searched in a faster manner.

Therefore, a primary objective of the present invention is to provide a method of indexing spatial object data which overcomes problems and deficiencies in the art.

A further object of the present invention is a method that divides space as characterized by the data based on the clustering of spatial object distribution.

A further object of the present invention is a method that divides space based on a hierarchy of quadtrees.

A further object of the present invention is to provide a search method which may be used with the spatial object indexing method of the present invention.

These, as well as other objects, advantages and features of the present invention, will be apparent from the following detailed specification and claims in conjunction with the accompanying drawings.

SUMMARY OF INVENTION

The present invention includes a method of indexing spatial object data comprising utilizing spatial object data which characterizes objects in a defined space, and dividing the space based on the clustering of the objects within the space.

The present invention can also include a method of searching spatial object data that includes utilizing spatial object data that has been gridded based upon clustering of the spatial objects. The grids are then recursively checked to see if they cover a range of interest. If the grids overlap the range of interest, objects within the grids are checked to see if they satisfy a search criterion.

The present invention can also include a computer readable medium containing computer executable instructions. The instructions cause the computer to divide a space, as characterized by data, containing spatial objects, based on clustering of the objects within the space.

DETAILED DESCRIPTION OF AN EXEMPLARY EMBODIMENT

The present invention will be discussed as it relates to two-dimensional spatial object data, as would be found in a map. Spatial object data refers to digitized data that is used to characterize physical objects, such as rivers and roads. However, it is not intended that the present method be limited to two-dimensional spatial data. It is understood that the principles can be applied to single dimensional object data as well as to objects having three or more dimensions. It is envisioned that the present method will be particularly useful in GPS receivers that have a display screen and in use with computer screens that display map data.

Figure 1:
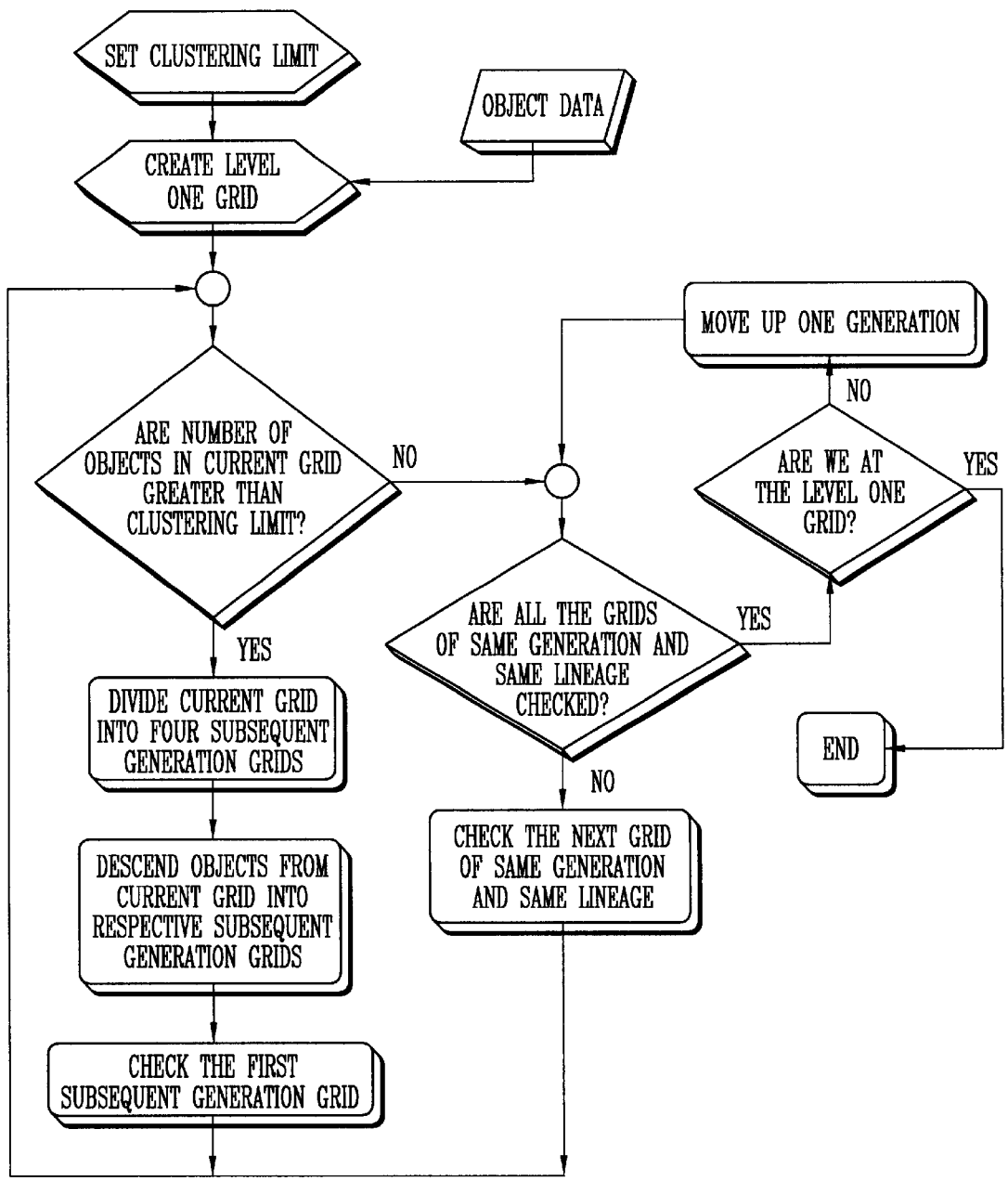
FIG. 1 is a flow chart which illustrates a method of indexing spatial object data according to the present invention.

FIG. 1 shows a flow chart illustrating a method according to the present invention. The first step is to set a clustering limit. Clustering refers to the density of spatial objects within a given area or volume. The clustering limit controls how many objects can be present with a given grid. The clustering limit will vary, depending on many variables, such as the type of spatial object data, the size of random access memory (RAM), the screen size and resolution (pixel size) on which the objects are displayed, video capability, viewing scale, and the particular application.

After the clustering limit has been set, a level one (or first generation) grid is created. The level one grid encompasses the geographic area of interest. For example, the geographic area of interest may be the United States. The level one grid would then encompass the United States. The object data could be digitized map data. The number of objects within the level one grid are compared to the clustering limit. If the number of objects exceeds the clustering limit, the level one grid (parent) is divided into four lower level grids (children). Each succeeding level of grids is referred to as a subsequent generation of grids. If the number of objects within the level one grid is less than or equal to the clustering limit, then the spatial objects will be indexed in the level one grid.

Once it has been determined that the number of objects within the level one grid exceeds the clustering limit, the level one grid (parent) is subdivided into four level two (or second generation) grids (children) and the objects from the level one grid are descended into their respective second level grids. The number of objects within each of the second level grids is compared to the clustering limit. Each of the second level grids (parents) in which the number of objects is greater than the clustering limit is further divided into four third level grids (children). This process continues recursively until all of the grids contain fewer objects than the clustering limit. The specific-details of FIG. 1 will be explained in further detail in conjunction with FIG. 3.

Figure 2:
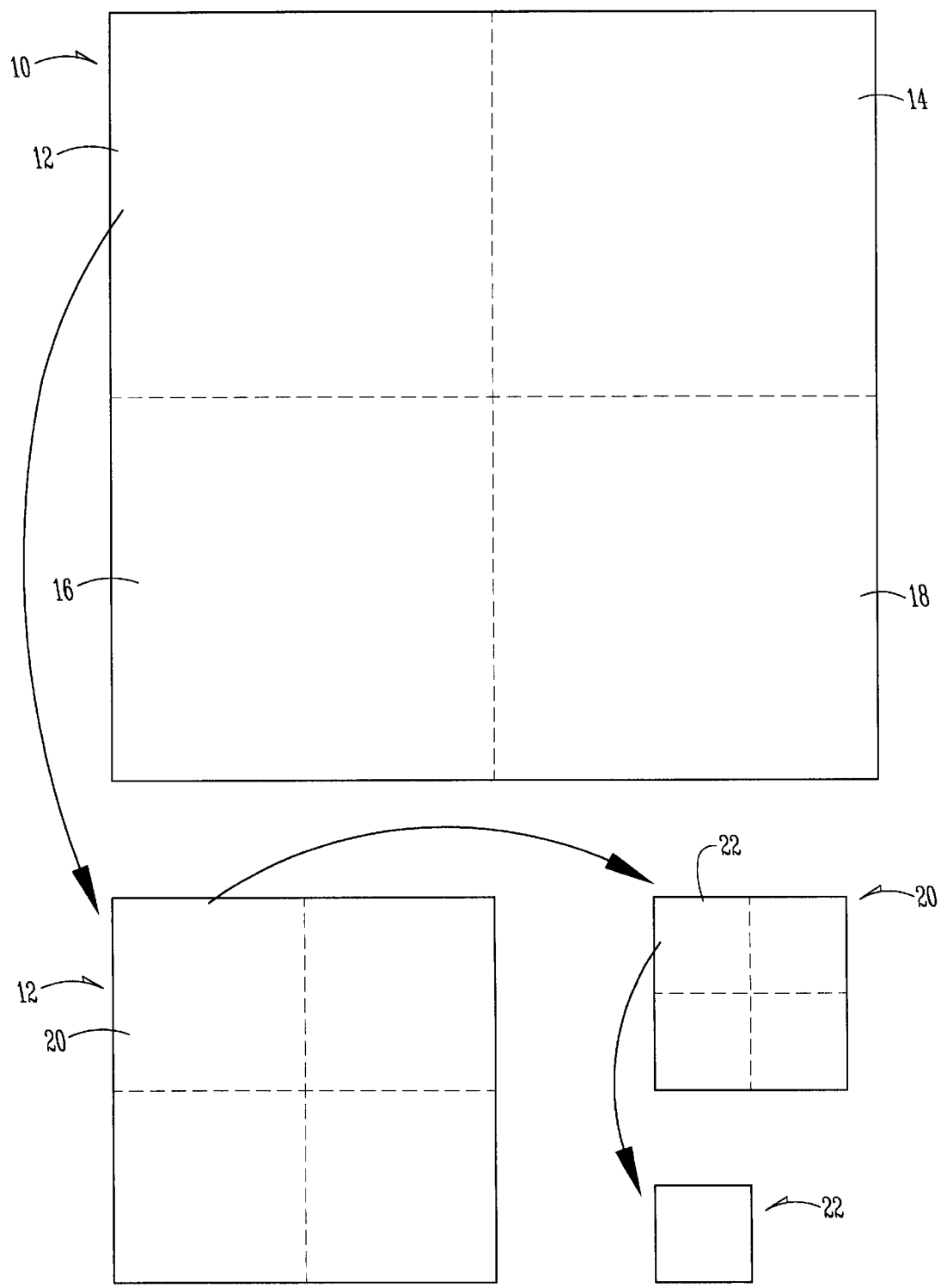
FIG. 2 is a schematic diagram which shows how space is divided based on a method according to the present invention.

FIG. 2 is a schematic diagram that gives a graphical illustration of the division of space based on a quadtree structure. The level one grid 10 encompasses the area of interest. The level one grid 10 is subdivided into four grids 12, 14, 16, 18. These four grids 12, 14, 16, 18 comprise the level two (or second level or second generation) grids. In FIG. 2, only one of the child grids for each succeeding generation is shown.

One of the second level grids 12 is further divided into four third level grids. One of the third level grids 20 is further divided into four fourth level grids. The level 4 grid 22 is the end of the spatial division.

Figure 3:
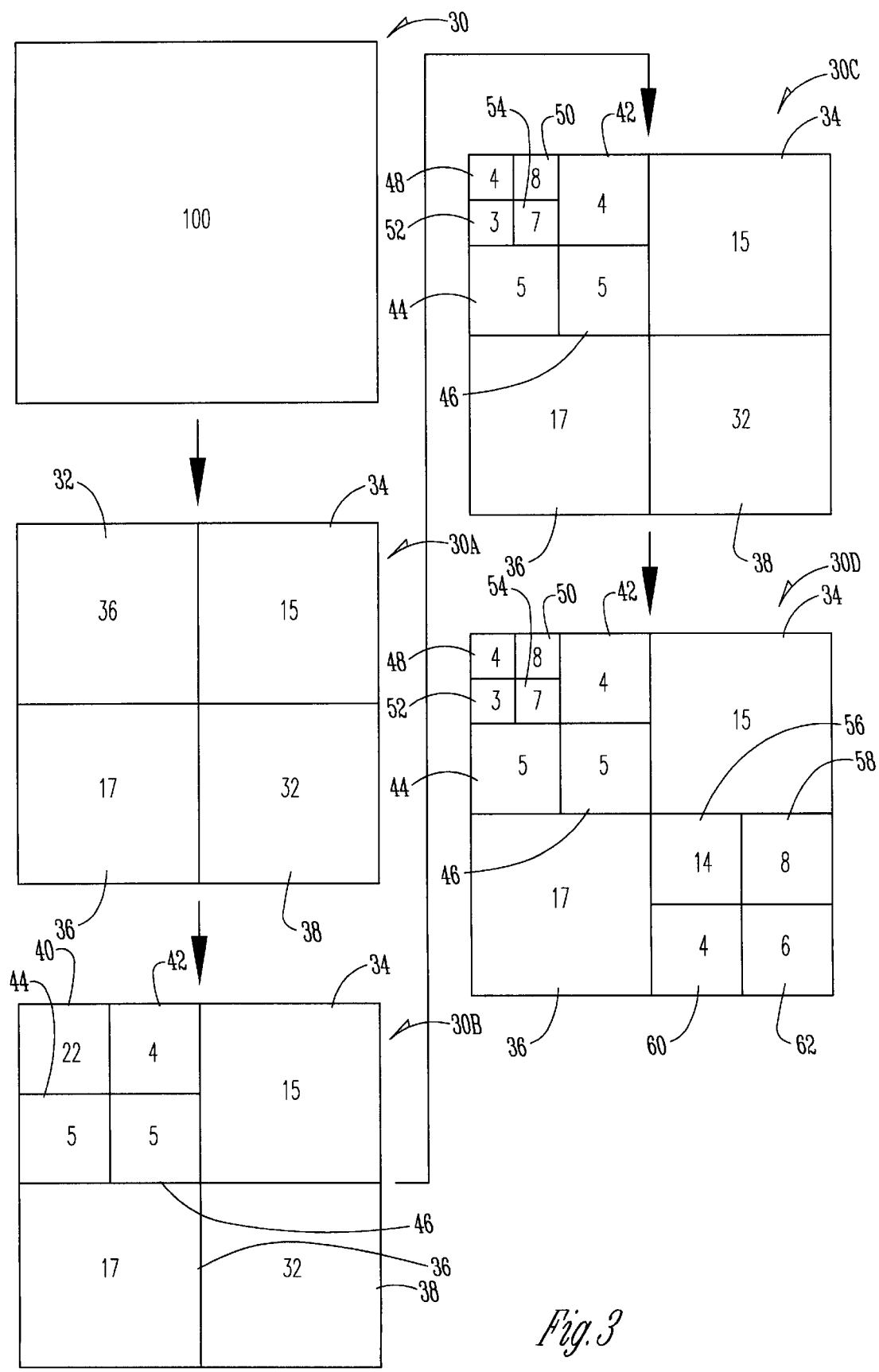
FIG. 3 is a schematic diagram showing the division of space according to the method of FIG. 1, using a numeric example.

FIG. 3 shows a schematic diagram illustrating a numeric example of the method of FIG. 1. The numbers inside each of the grids in FIG. 3 represent the number of objects within the respective grids. For the example in FIG. 3, the clustering limit has arbitrarily been set at 20. Setting the clustering limit is the first step shown in FIG. 1.

The level one grid 30 encompasses the geographic area of interest, for example, the United States. There are 100 objects within the level one grid 30. This exceeds the clustering limit, so the level one grid 30 is subdivided into four second level (or children) grids 32, 34, 36, 38. Since the method of the present invention will usually be implemented in a computer program, there are a number of ways to determine when a grid needs to be further divided. The total number of objects within a grid could be counted and then compared to the clustering limit. Rather than counting all of the objects within a grid, the objects could be counted until the number of objects exceeds the clustering limit, at which point the grid would be subdivided. The method of the present invention can be implemented in many computer languages, such as, for example, C++.

It should be understood that the parent grids would not have to be divided into four children grids. A different number of child grids could be used. For example, the parent grids could be divided into two children grids. The preferred method is to divide the parent grids into $2^n$ equal sized children grids, wherein n is the maximum number of spatial dimensions of the objects. In most situations, the objects will be two-dimensional. However, it is understood that the present invention could be applied to single dimension objects or to objects having three or more dimensions.

Returning to FIG. 3, the 100 objects from the level one grid 30 are descended to the second level grid 30A, into their respective child grids, 32, 34, 36, 38. The second level grids 32, 34, 36, 38, encompass 36, 15, 17, and 32 objects, respectively.

Once the second level grids encompassing their respective objects have been created, the number of objects within the first second level grid 32 is compared to the clustering limit. There are 36 objects within the grid 32. This exceeds the clustering limit, so the second level grid 32 is divided into four third level grids 40, 42, 44, 46. The objects from the second level grid 32 are descended into these third level grids within grid 30B.

Next, the first grid 40 in the third level is interrogated, and the number of objects 22 in the grid 40 exceeds the clustering limit. Therefore the grid 40 is divided in grid 30C, into four fourth level grids 48, 50, 52, 54, respectively. The objects from the third level grid 40 are descended into the fourth level grids 48, 50, 52, 54.

The first fourth level grid 48 is checked, and it can be seen that the number of objects, 4, is less than the clustering limit. From the flowchart of FIG. 1, the next step then is to check whether all of the grids of the same generation and same lineage have been checked. Same lineage means those grids that are in the direct line of descent from "ancestor" grids. The current grids of the same generation and same lineage are the fourth level grids 48, 50, 52, and 54. Not all of these grids have been checked. Therefore, from the flowchart in FIG. 1, the next step is to check grid 50.

The number of objects, 8, in grid 50 is less than the clustering limit. Grids 52 and then 54 are checked in a similar manner. The number of objects within each of the grids 52, 54 is less than the clustering limit. After grid 54 has been compared to the clustering limit, all of the grids of the same generation and of the same lineage have been checked. From FIG. 1, the next determination is whether the level one grid has been reached. Since the level one grid has not been reached, we move up one level or generation, to the third level, grid 30B in this example, and check the next grid in the third level.

The next grid in the third level is grid 42. This grid 42 has 8 objects, which is less than the clustering limit. In turn, grid 44 and grid 46 are checked. The number of objects in each grid 44, 46 is less than the clustering limit.

After grid 46 is checked, the method moves up one level to the second level, grid 30A, as we are not at the level one grid. Not all of the grids in the second level have been checked. The next grid 34 in the second level is checked. The number of objects, 15, in the grid 34 is less than the clustering limit, so the grid 34 does not need to be divided any further.

The next grid 36 on the current level has fewer objects, 17, than the clustering limit. Grid 36 does not need any further division. The checking of grids 34 and 36 is accomplished in grid 30C in the example in FIG. 3.

Next, grid 38 is checked. Since the number of objects, 32, exceeds the clustering limit, grid 38 is divided into four third level grids 56, 58, 60, 62, within grid 30D. Each of these grids 56, 58, 60, 62 is checked in turn, with each one having fewer objects than the clustering limit.

To ensure that the entire space has been checked, the method proceeds upward until it reaches the level one grid. After grid 62 has been checked, the method moves up one level, to grid 30A. All the grids in level two, grid 30A, have been checked. Thus, the method moves up one level. Moving up one level brings the method to the level one grid, grid 30. Having reached the level one grid, the method is at an end.

It will be readily apparent to those skilled in the art that there are other ways to implement a computer program that achieves the same results accomplished by the method of FIG. 1. For example, rather than proceeding in an up and down manner so that one lineage is completed before checking the next one, the method could check the grids in a generation-to-generation method. Thus, all of the second generation grids would be interrogated and divided before any third generation grid was interrogated. In addition, rather than going back to the top before terminating, a different method could be employed to determine whether all of the space had been divided.

It should also be understood that the total number of objects within a grid does not have to be used to determine whether subdivision is indicated. As is known in the art, objects are often stored in layers based on the geographic features of the object. For example, there may be a layer which contains objects of type river, and there may be a different layer that contains objects of type interstate highway. A user may be interested in locating all interstates within a given area. Therefore, one could index all interstate highways using the method of FIG. 1.

Referring again to FIG. 3, some of the searching benefits that result from indexing object data according to the present invention can be seen. As an example, suppose someone was interested in finding all of the highways close to a point, the point being located in grid 62. For this example, highways close to the point are those within the area bounded by grid 38. The first step in searching through the indexed data is to determine whether the level one grid 30 encompasses the area of interest. In this case, grid 30 does encompass the area bounded by grid 38.

After determining that the level one grid 30 covers the area of interest, the next step is to determine which subsequent generation grids encompass the area bounded by grid 38. Grids 32, 34, and 36 are checked in turn. None of these grids cover the area of interest. Since these grids are not in the range of interest, none of the objects within these grids, or their subsequent generations, will have to be examined. Next, grid 38 is checked and it covers the area of interest. However, there are no objects in grid 38 because the objects have been descended into the subsequent generation grids 56, 58, 60, 62.

Grid 56 is checked to determine if it covers the area of interest. Since it does, the objects within the grid are checked to see if any of them meet the search criteria, highways in this example. All of the highways in grid 56 will be returned by the search. In the same manner, grids 58, 60, and 62 will be checked to determine if they are in the range of interest. Since they all are, all of the objects within these grids 58, 60, 62 will be checked and the highways within these grids will be returned by the search.

As can be understood, searching within the gridded data is recursive. Each grid, or quadrant, is checked to see if it covers the range of interest. If a grid covers the range of interest, the objects within the grid will be examined. If the grid is further divided into subsequent generations, each subsequent generation grid will be checked to determine if it covers the range of interest. The searching process is a recursive one that checks (1) if a grid is in the range of interest; and (2) if objects within the grids that cover the range match the search criteria. Thus, for grids that are not in the range of interest, their subsequent generations will not be examined. Therefore, fewer objects will have to be examined and a search for objects will take less time.

It should be readily apparent to one skilled in the art that the above method of searching data indexed based on clustering is readily applicable to use in a vehicle in conjunction with a Global Positioning System (GPS) and an apparatus to display the points desired. Furthermore, it should be readily apparent to one skilled in the art to combine these with a route manager to assist the driver or transportation engineer in traversing the displayed terrain. This includes, but is not limited to, forms of transportation, whether water, land, or air based, including: public transportation, emergency response or public safety, commercial transport or delivery, and military transport.

A route manager determines a route of travel as indicated by position.

The present invention has been described as it applies to specific exemplary embodiments. However, it is not intended that the present invention be limited to the described embodiments. It is intended that the invention cover all alternatives, modifications, and equivalents which may be included within the spirit and scope of the invention.

What is claimed is:

1. A method of indexing spatial object data, comprising:
   utilizing spatial object data which characterizes objects within a defined space;
   determining a clustering limit equal to a maximum number of objects and based on at least one of memory size, screen size, screen resolution, viewing scale, and the type of application;
   dividing the space based upon clustering of the objects;
   identifying if the clustering limit has been reached for a particular cluster of objects.

2. The method of claim 1, further comprising:
   encompassing the space with a level one grid;
   dividing the level one grid into second generation grids if indicated by a comparison between the clustering in the level one grid and the clustering limit;
   recursively dividing at least one of the second generation grids into subsequent generation grids if indicated by a comparison between objects in at least one of the second or subsequent generation grids and the clustering limit.

3. The method of claim 2 wherein the comparison is between objects in each of the second and subsequent generation grids and the clustering limit.

4. The method of claim 3 wherein grids are divided into $2^n$ equal sized subsequent generation grids, wherein n is an integer.

5. The method of claim 4 wherein n is the largest number of spatial dimensions of the spatial objects.

6. The method of claim 5 wherein n equals 2 or 3.

7. A computer readable medium having computer executable instructions for causing a computer to perform the steps of:
   utilizing spatial object data that characterizes objects within a defined space;
   dividing the space based upon clustering of the objects;
   indexing the objects of each cluster into different layers, each layer being related to at least one object type;
   determining a clustering limit equal to a maximum number of objects and based on hardware limitations of the computer and associated display; and
   identifying if the clustering limit has been reached for a particular cluster of objects.

8. The computer readable medium of claim 7, having further computer executable instructions for causing the computer to perform the steps of:
   setting, or receiving as input, a clustering limit;
   encompassing the space with a grid;

recursively dividing the grid into subsequent generation grids if indicated by a comparison between objects in at least one subsequent generation grid and the clustering limit.

9. The computer readable medium of claim 8 wherein the comparison is between objects in each of the subsequent generation grids and the clustering limit.

10. The computer readable medium of claim 9 wherein parent grids are divided into 2" equal sized subsequent generation grids with n being the largest number of spatial dimensions of the spatial objects.

11. The computer readable medium of claim 10 wherein n equals two.

12. The computer readable medium of claim 10 wherein n equals three.

13. The computer readable medium of claim 7 in combination with a computer, the computer having a memory and a processor.

14. The computer readable medium of claim 8 in combination with a computer, the computer having a memory and a processor.

15. A method of searching through spatial object data, comprising:
   utilizing spatial object data that has been indexed in grids based upon clustering of the spatial objects according to a clustering limit equal to a maximum number of objects; and
   recursively determining if the grids cover a range of interest, and if so, checking objects within the grids to see if they satisfy a search criterion.

16. The method of claim 15 wherein the search returns objects satisfying the search criterion.

17. The method of claim 16 wherein the search returns are displayed on a graphical display.

18. The method of claim 17 wherein the graphical display is a GPS screen.

19. The method of claim 18 wherein the GPS screen also displays a current location of a GPS device.

20. The method of claim 17 wherein the graphical display is a video monitor.

21. A computer readable medium having computer executable instructions for causing a computer to perform the steps of:
   utilizing spatial object data indexed in grids based on clustering of spatial object data, recursively determining if the grids cover a range of interest, and if so checking objects within the grids to see if they satisfy a search criterion;
   indexing the objects of each cluster into different layers, each layer being related to at least one object type;
   determining a clustering limit equal to a maximum number of objects and based on hardware limitations of the computer and associated display; and
   identifying if the clustering limit has been reached for a particular cluster of objects.

22. The computer readable medium of claim 21 in combination with a computer, said computer having a memory, a processor, and a display.

23. The computer readable medium of claim 22 in further combination with a Global Positioning Device.

24. The computer readable medium of claim 23 in further combination with a vehicle.

25. A vehicle comprising:
   a vehicle;
   a computer readable medium having computer executable instructions for causing a computer to perform the steps of utilizing spatial object data indexed in grids based on clustering of spatial object data, recursively determining if the grids cover a range of interest, and, if so, checking objects within the grids to see if they satisfy a search criterion, indexing the objects of each cluster into different layers, each layer being related to at least one object type, determining a clustering limit equal to a maximum number of objects and based on hardware limitations of the computer and associated display, and identifying if the clustering limit has been reached for a particular cluster of objects;
   spatial object data indexed in grids based on clustering of spatial object data;
   a computer having memory and processor;
   a global positioning system device; and
   a display adapted to indicate position.

26. The vehicle of claim 25, further comprising,
   a route manager.

* * * * *